Dec. 26, 1967 J. J. HORAN 3,360,077
RETAIL MERCHANDISING FACILITIES AND METHODS OF USING SAME
Filed June 15, 1966 4 Sheets-Sheet 1

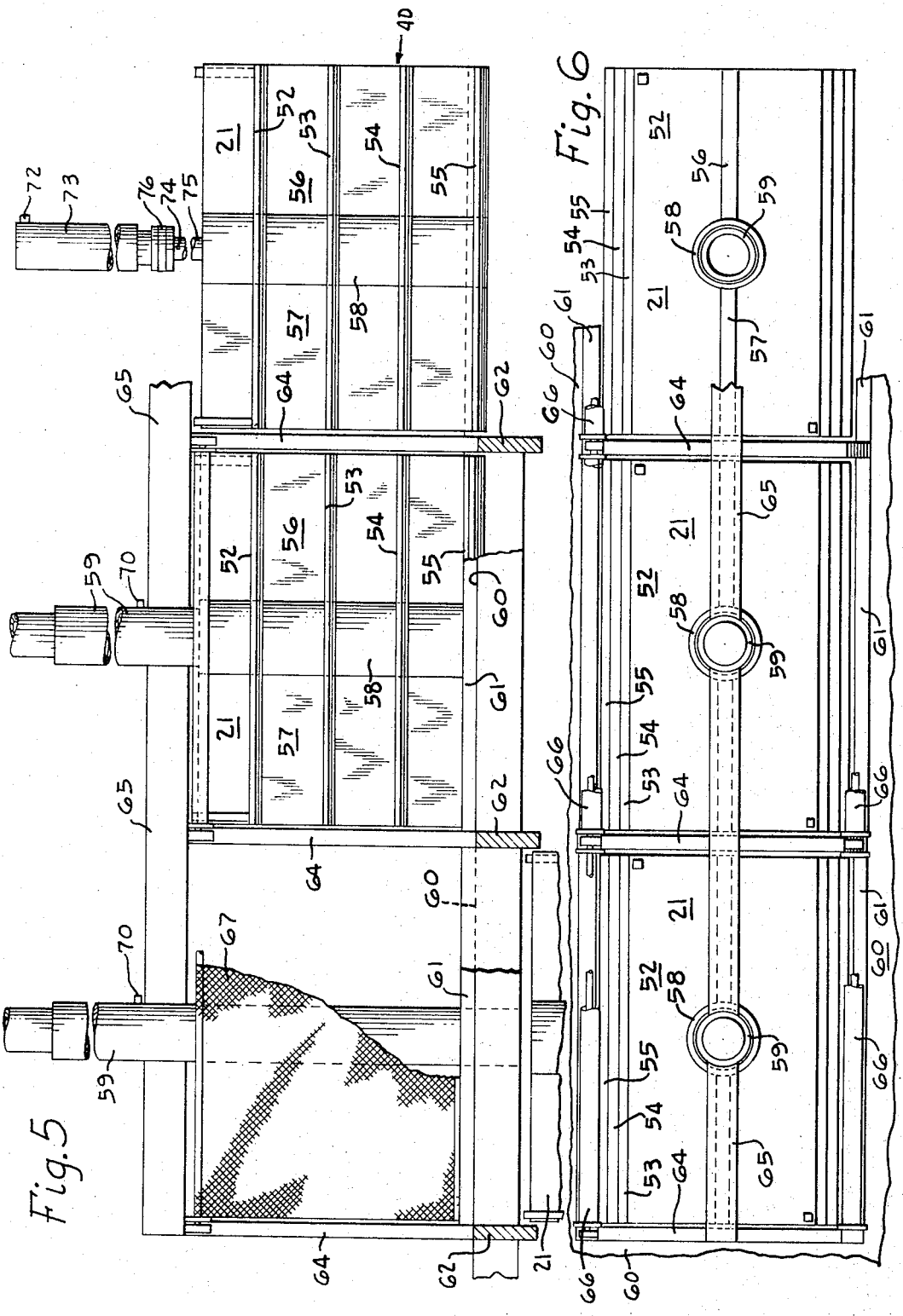

Dec. 26, 1967   J. J. HORAN   3,360,077
RETAIL MERCHANDISING FACILITIES AND METHODS OF USING SAME
Filed June 15, 1966   4 Sheets-Sheet 3
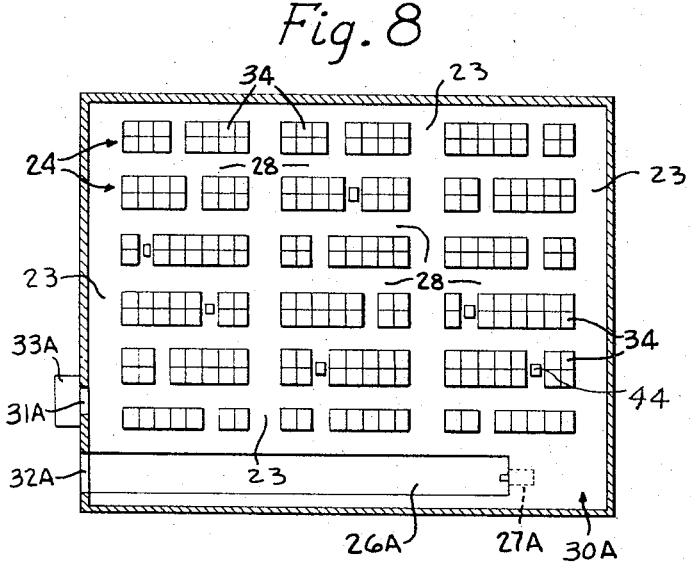
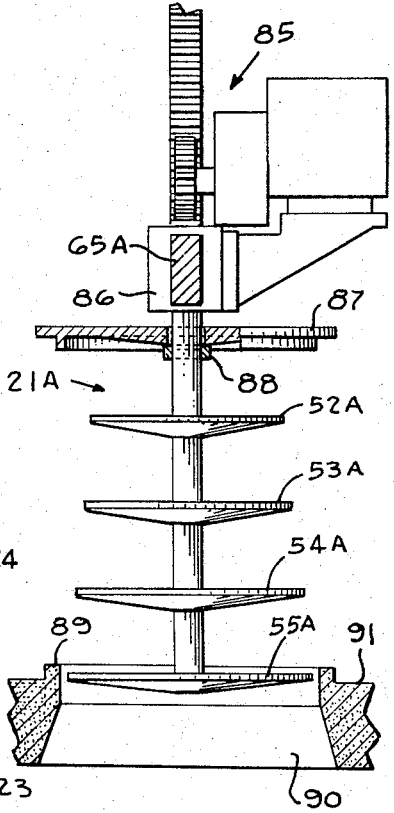
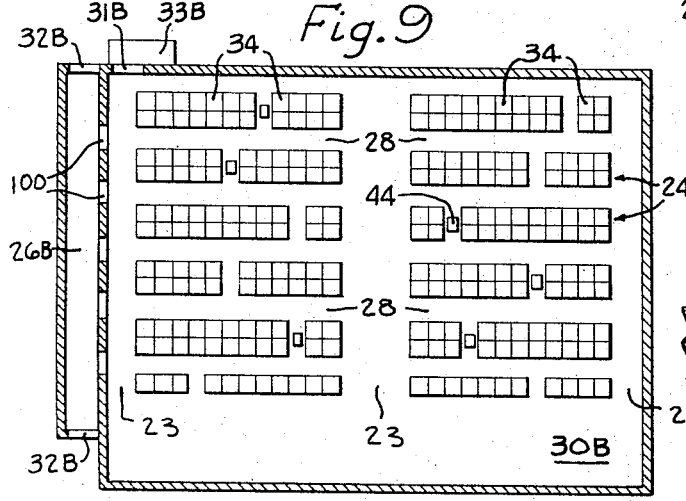
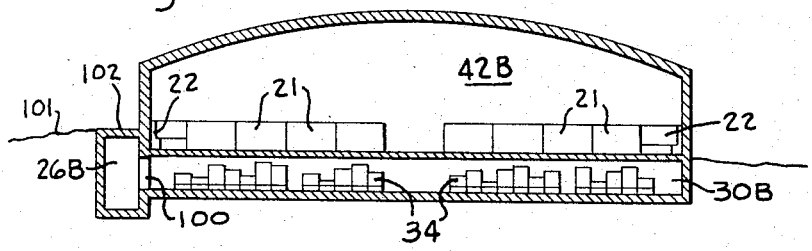

Dec. 26, 1967     J. J. HORAN     3,360,077
RETAIL MERCHANDISING FACILITIES AND METHODS OF USING SAME
Filed June 15, 1966     4 Sheets-Sheet 4

United States Patent Office 3,360,077
Patented Dec. 26, 1967

3,360,077
RETAIL MERCHANDISING FACILITIES AND
METHODS OF USING SAME
John J. Horan, 420 Quigley Ave.,
Willow Grove, Pa. 19090
Filed June 15, 1966, Ser. No. 557,716
16 Claims. (Cl. 186—1)

ABSTRACT OF THE DISCLOSURE

This invention discloses a retail facility employing self-service merchandise-display counters that reciprocate from basement stockroom to main-floor salesroom, plus ancillary means and methods for reducing costs of stockkeeping and inventory.

---

This invention relates to retailing, especially that involving very high turnover of compact, standardized items, such as the food sold in the retail facilities known as "supermarkets."

While today's self-service supermarket is much more efficient than the old-fashioned grocery store, there is still a great deal of merchandise handling. Trucks and trailers are generally unloaded via platform docks at the rear of the store, often at night, because there is insufficient room for accommodating stockroom personnel and their activities in the face of the congestion that attends trailer unloading. Stockroom personnel spend a large part of their time moving stock, rearranging and staging it, carrying and repiling cartons, etc., before unloading the stock piles into small vehicles that must be trundled out into the retail area in the customer-congested aisles, where the items must be taken out of the cartons, price-stamped, and put on the shelves. Dunnage must be collected, put back on the cart, and pushed past customers congesting the aisles with their own carts, on its way back to the stockroom for disposition.

It is an object of this invention to reduce to a minimum the amount of stockhandling labor expended in retail stores, warehouses, and their various vehicles.

It is an object of this invention to systemize stock placement in such a manner that it is not again transported after the trailer-off loading operation, and is handled only once more when it is shifted off the stockpiles directly onto the retail counters, thus eliminating present intermediate staging, repiling, and trundling.

It is the object of this invention to design new food stores and redesign old ones so that virtually all of the main-floor building area may be devoted to those facilities to which customers must have access.

An object of this invention is to place all stock-handling activities on a separate floor so that the maximum amount of ground area on the principal level will be available for parking of customers' automobiles.

An object of this invention is to eliminate trundling of merchandise in vehicles out into the customer-access areas and thus interfering with shoppers.

It is an object of this invention to remove pricing and repricing, date-code checking, noisy carton opening and breakup, etc., from observation by customers.

An object of this invention is to locate offloaded merchandise stowage within arms reach of the retail counters to which the merchandise will eventually be shifted.

An object of the invention is to bring all self-service display counters directly and expeditiously to the appropriate stock-storage area for cleaning, inspection, and replenishment, where these activities can be more efficiently performed.

It is an object of this invention to facilitate inventory maintenance and accounting by having all stock of a kind and the records therefor together available for direct comparison.

Other objects and novel features will be seen in the balance of the specification, in the claims, and in the drawings, in which:

FIG. 5 is an elevation showing means for supporting and moving counters between levels;

FIG. 6 is a plan view of the facilities seen in FIG. 5;

FIG. 7 is a lateral view of a counter arrangement alternative to that of FIG. 4;

FIG. 8 is a plan of an alternative stockroom suitable for coaction with FIG. 2;

FIG. 9 is a second alternative stockroom plan suitable for coaction with FIG. 2;

FIG. 10 is an elevation corresponding to a combination of FIGS. 2 and 9;

Figure 1:
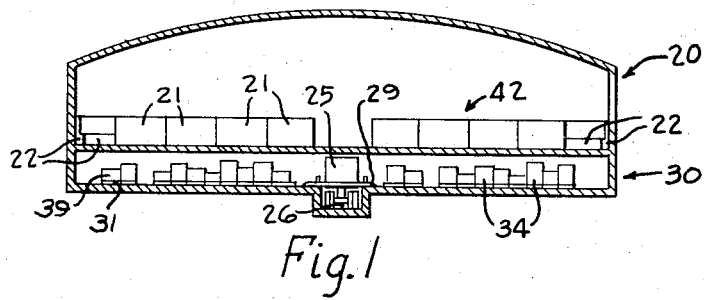
FIG. 1 is a greatly reduced view of an interior elevation of a retail store in accordance with this invention.
Figure 2:
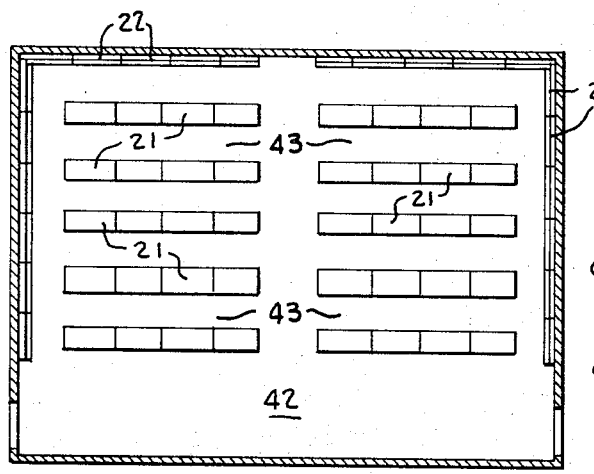
FIG. 2 is a similarly scaled view of the salesroom floor plan.
Figure 3:
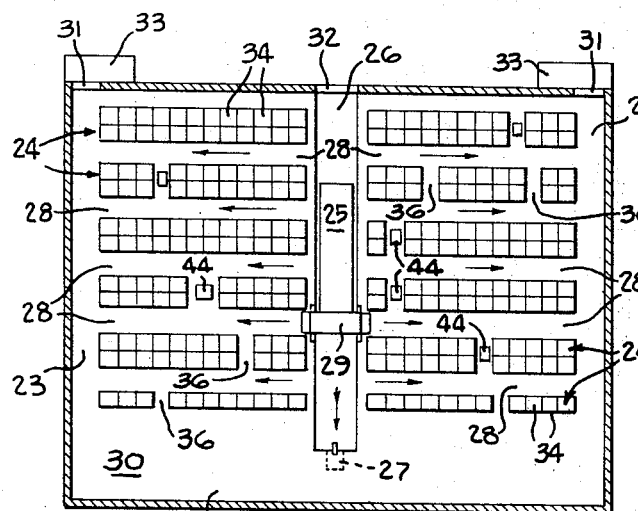
FIG. 3 is a view of the stockroom floor plan.

Referring now specifically to FIGS. 1, 2, and 3, there is seen a two-level retail store in which the sales floor of FIG. 2 is above the stockroom of FIG. 3, though in some instances it will be desirable to reverse this arrangement.

Self-service merchandise display counters 21, 22 in FIG. 2 are preferably arrayed in rows as seen. Although it has been assumed for the showing herein that individual counter modules are 12 feet long by 5 feet wide by 6 feet high, it will be obvious to those practicing in the art that other proportions may be chosen. It will be obvious that counters may be arranged singly, especially if they are long, or in rows of more or less than four. Similarly, wall counter modules 22, herein assumed to be 12 feet long by 3 feet deep by 6 feet high may likewise be assigned different proportions. Counters may take on many different kinds of configurations, including freezer cases, bins, racks, etc., and may have dispensers, conveyors, chutes, etc., incorporated for various purposes. However, to keep this disclosure concise, they will be represented as simple, 4-shelf types.

Since FIG. 2, showing the sales floor plan, and FIG. 3, showing the stockroom, are to the same scale, it is apparent that the sales counters 21 are situated midway between the positions assigned to the rows 24 of palletloads 34 on the stock level. The sales counters 21, 22 move through openings below them from the sales floor to the stockroom for direct replenishment from the adjacent palletloads 34. Usually replenishment takes place while the store is closed; but counters 21, 22 may be reloaded at any time, as will be discussed more fully hereinafter. The stock rows 24 will, therefore, be arranged to locate the correct cartons of merchandise next to the appropriate counters. Wall counters 22, when brought to the stock level, will ordinarily be fed by those palletloads 34 that are at the ends of the rows 24, or special rows may be provided opposite them. Thus, aisles 43 are next to the upper stations for counters 21 in salesroom 42, while stock rows 24 are next to accessways 28, where the respective lower stations are also located. Accessways 28 in stockroom 30 are interconnected via corridor accessways 23.

Since most of the stock will arrive on pallets in trailers loaded at the chainstore warehouse, the trailers may now be conveniently loaded in accordance with programs matched to the retail facility layouts; in fact, the warehouse itself may be laid out to suit the arrangement common to most member stores. Trailer 25 is backed by the tractor into position at the depressed rear entrance 32. While the tractor could move trailer 25 progressively along its path through channel or passageway 26 across the rows 24 of palletloads 34, it will preferably have been detached and will pick up the now-empty trailer left on a previous trip.

An auxiliary driving means, perhaps a winch 27, moves the trailer 25 a few feet at a time in the direction of the double-headed arrow in order to line up its end or its side openings consecutively with successive accessways 28 it reaches, which accessways 28 are interlaced alternately between the rows 24 of palletloads 34 of stock. While the rectangle 29 in FIG. 3 might represent a letdown tailgate, it preferably indicates a separate car at tailgate level and equipped with guard rails and linked to the end of the trailer 25. Car 29, if used, should have sufficient table area to afford a handy, roomy offloading facility for trailers, with turning board for moving palletloads 34 into the accessways 28; and it may serve as a link for coupling trailer 25 to winch 27. Preferably, however, car 29 is electrically powered, with pushbutton inching control for moving the trailer along channel 26. While 25 may represent a truck or a tractor-trailer combination, the detached trailer can do the job at lower overall cost. While depression of channel 26 is not mandatory, it is well worthwhile.

Fork lifts carrying palletloads 34 move along accessways 28 as shown by arrows. The palletloads 34 are carried only far enough to bring their contents directly below similar stock on self-service counters 21 now located above accessways 28. The floor of accessways 28 may be painted or stenciled or the undersides of the counters 21, 22 above may be labeled to indicate which items are carried where on each counter. Each palletload 34 of merchandise is then turned off the accessway into the appropriate spot, paint-outlined or otherwise indicated on the floor of the stock row 24. Space allowed for counters and palletloads includes enough additional room for personnel to move and load the counters handily.

Cartons that have been emptied of packages and pallets that have had all cartons removed therefrom will be removed from the stock rows 24 and moved down the lengths of the accessways, still in the direction of the arrows, to the far wall, whence they will be transported toward the front of the stockroom and to the head of the channel 26, where they will await the arrival of the now-empty trailer 25, that will return them and the dairy carriers, etc., and perhaps even trash and garbage, back to the warehouse or to intermediate depots. Other activities located here at the most forward end of stockroom 30 may include baling apparatus for spent cartons, a stairway, rest rooms, an elevator (optional) etc., the forward area normally being just below the spaces on the sales floor 42 normally assigned to checkout registers, cashier, shopping-cart stowage, etc.

Additional doors 31, besides the large door that opens into channel 26, may open at the level of the stock floor 30 from auxiliary offloading docks 33, where soft-drink, bakery, dairy, or other special purpose trucks deliver smaller loads of goods that do not come directly from the company warehouse. Occasionally, for reasons of topography, grade, access between buildings, etc., it may be necessary, though undesirable, to offload such items upon the sales-floor level.

Since stock is rarely piled in the stock accessways 28, the counters 21, 22 may be lowered therein, for replenishment from the adjacent cartons of stock on the palletloads 34. A counter may be lowered in stages, its several shelves being brought successively past the levels of the palleted cartons or of the tops of the portable work tables 44 which are preferably plug-in powered and equipped with appropriate price stampers, sticker and tape dispensers, carton-opening fixtures, knives or other tools and work-saving devices (which cannot be left lying in spaces accessible to the public), pricing schedules for goods in a particular area, and inventory and stock-management controls and records.

The cartons of stock 39 (not shown separately here) remain upon the pallets 31, upon which they were placed back in the warehouse, until the palletloads 34 are depleted, as at 36 in FIG. 3 to be replaced by fresh palletloads 34. For best operation, not over ⅔ of palletload spaces should contain stock, preferably less.

Figure 4:
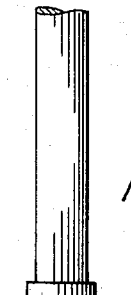
FIG. 4 is an end view of a sales counter and its relationship to salesroom and stockrooom.

Referring now specifically to FIGS. 4–6, a typical counter is seen in end view, elevation, and plan, the latter figures also showing additional counters. Counters 21 have 4 shelves, 52, 53, 54, and 55 on each side. Metallic counters will normally have shelves welded directly to the backplates 56, 57, which in turn are welded to the shield tube that serves as an outer protection for the elevating mechanism and prevents fluids from dripping upon the merchandise. Tube 58 may be designed with close tolerances and heavy structure to stiffen fixed tube 59 against lateral forces, or a swiveling device may be inserted to prevent transmission of such forces from the counter. Dotted lines in FIG. 4 show a loading position of counter or rack 21, though it is not in the extreme downward position. When self-service counter 21 is at the sales floor position, the edge of its bottom shelf 55 is guarded by ridge 71 against the sweeping of dust thereon from floor 60, as well as against the spilling out of poorly stacked merchandise when the counter is lowered.

Counter 21 is kept aligned by the presence at its ends of pedestals 64 upon which counter-support beam 65 rests and which deliver the load to floor 60 and to the series of embedded transverse beams 62, 62, that support the structure across the discontinuities or openings 63 that permit the counters 21, 22 to transit between levels. Particularly when counters, such as 22, 22, are mounted alongside walls, the pedestals are likely to deliver their loads directly to such walls.

Pedestals 64 also carry curtain rolls 66, the curtains 67 being dropped and locked by any convenient means to ridges 61 whenever a rack or counter 21, 22 needs to be replenished from the stock room 30 while customers are in the store. The use of curtains 67, which may include chain mesh, permits all counter positioning adjustments on the stock level to be made safely, it being known that the high turnover and consequent inexperience of large percentages of stockroom employes and the presence of the public require that a system such as this be not only "idiot-proof" but also mischief-proof as well. Fail-safe design philosophy should be incorporated.

Beam 65 and tube 59 may be welded into a continuous fixed supporting structure, pedestals 64 and transverse beams 62 also preferably being welded into this bridging structure. Racks or counters 21, 22, may be most easily assembled into this fixed structure if the two sides are separate assemblies bolted together. Other means of separation and assembly will be obvious to those skilled in the mechanical arts. One means of admitting hydraulic fluid (or air) to tube 59 is via fitting 70, which may feed a longitudinal passageway in or upon the wall of cylinder 59, another being via a hose connection to fitting 72 at the top of the guide portion 73 of piston-rod assembly 75, the central passageway leading to orifice 74 below packing 75.

When counter 21 is lowered for replenishment in the stockroom, even the uppermost shelf 52 drops below the level of the pedestals 64 at the ends. Thus, counter 21 might tend to rotate about the axis of the hydraulic hoist, were it not for guides 80, seen in FIG. 4, rising in pairs from each end of shelf 52. Counter 21 may be adjusted downwardly until swivel stop 81 abuts stockroom floor 82. If swivel stop 81 is first rotated 90° to a horizontal position, counter 21 may then be lowered to a position where it may be rotated about the axis of its hoist.

The rotating feature is of particular value when a counter is circular rather than oblong in plan view, as is the counter 21A in FIG. 7. A circular counter may, of course, be most easily replenished if it is rotatable in the manner of a lazy Susan. The circular counter of FIG. 7, with shelves 52A, 53A, 54A, and 55A, is raised and lowered by means of rack-and-pinion drive 85 mounted on bridge structure 65A. The rack may be circular or there may be bearing or swiveling structure interposed between the rack and counter 21A, suspended therebelow via a vertical opening (not seen) in the enlarged portion 86 of beam 65A.

Above counter 21A, cover plate 87 rests on shoulder 88. When counter 21A descends, cover plate 87 rests upon ridge 89 surrounding opening 90 in floor 91. Plate 87 may carry illuminating means for the counter on its undersurface. One or two counters may have a bottom shelf only, to accept and poise full palletloads or fractions, as of soft drink can assortments, prearranged at the bottling works.

The alternative stockroom layout for the facility seen in FIG. 8 would be most useful if access for trailer channel or passageway 26A were unavailable behind stockroom 30A, making it mandatory for trailers to approach the stock level in a direction parallel to the alignment of counters above and rows 24 of palletloads 34 in the stockroom instead of perpendicular thereto. This arrangement generally requires either somewhat longer distances of palletload 34 travel or minor rearrangements of stock rows. It may be desirable to have more corridor accessways than were needed in FIG. 3. A truck off loading dock 33A is accessible via door 31A.

The alternative layout seen in FIGS. 9 and 10 shows one approach to the problem of providing a channel 26B for trailers where an existing store has or can be modified to have a stockroom 30B below salesroom 42B. In lieu of full opening alongside channel 26B, a series of ports 100 may be cut in existing bearing wall structure, assuming that the substituted reenforcement of the wall is adequate; and palletloads 34 may be passed from the trailer via these ports 100, which may optionally be closed by doors to conserve heat when traffic is not flowing through them. Depending on local terrain, soil removed in cutting channel 26B may be redistributed, perhaps in the manner shown at 101, followed by repaving 102 so as to permit the parking of customers' cars above channel 26B, thus conserving land area for utmost utility. A dock 33B alongside channel passageway 26B permits offloading trucks via door 31B while channel 26B is occupied. Channel 26B has doors 32B at both ends for through passage, which practice is sometimes possible with other layouts also.

Figure 11:
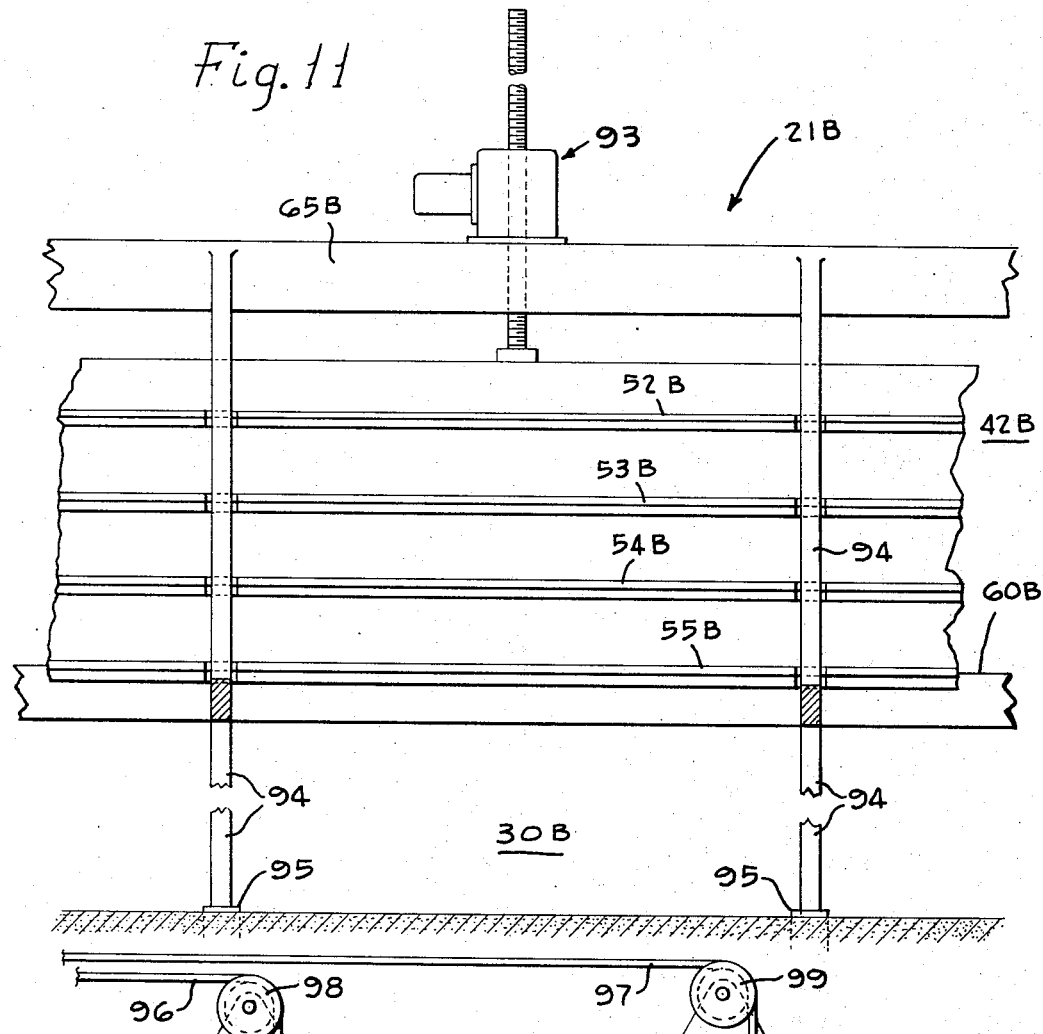
FIG. 11 is a front view of an alternative counter lifting and support means.

Referring now to FIG. 11, counter 21B is supported by a ball-screw elevation adjustment drive 93 carried on beam 65B. One such drive is the "Roll-Ramp" linear actuator. Beam 65B is in turn carried by columns 94 which are inclined or offset somewhat in the manner of the legs of an A-frame in order to guide counter 21B by means of slots in shelves 52B, 53B, 54B, and 55B, while spreading outwardly below so that feet 95 of columns 94 rest on the floor of stockroom 30B within the rows (not shown) of palletloads and well clear of accessways between them. Like beam 65B, counter 21B is continuous beyond columns 94 and may have additional columns in either or both directions.

Figure 12:
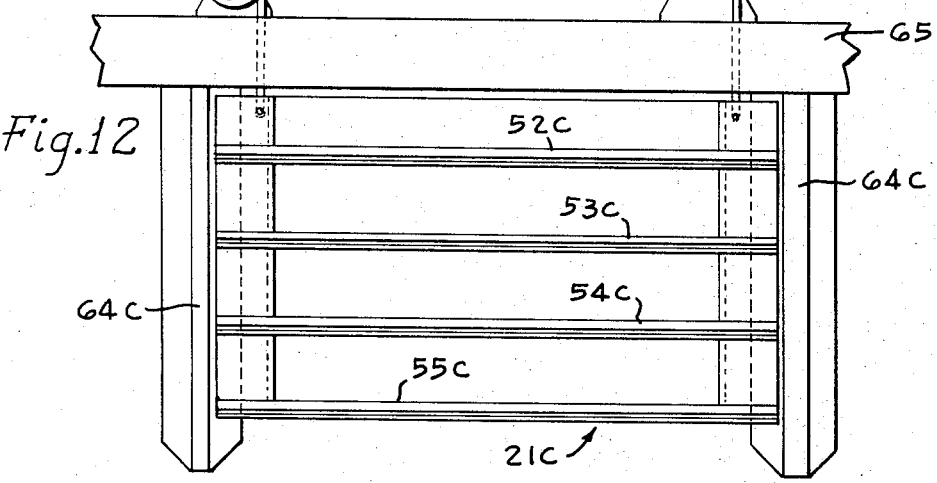
FIG. 12 is a view of still another counter lifting and support arrangement.

Referring now to FIG. 12, Counter 21C, under beam 65C, which rests on pedestals 64C is elevated and lowered by a double-chain or cable arrangement 96, 97, powered from a remote point. The chains 96, 97 ride upon pulleys 98, 99 respectively, mounted on beam 65C.

Many combinations will be immediately obvious to those skilled in the art as a consequence of my disclosures, without departing from the true scope of this invention. It is, accordingly, intended to include in the appended claims such portions and equivalents as may fall within this scope. I wish it understood that my invention is not limited to the specific forms to which I have limited my descriptions, drawings, and claims for the sake of brevity and expeditious prosecution.

Therefore, I claim:

1. A facility for retail selling of various kinds of packaged merchandise, said facility comprising:
    a building having wall means enclosing a stockroom on a lower floor and a salesroom on an upper floor;
    at least one reciprocably mounted, two-station, self-service, merchandise-display counter,
    said counter having a normal range of reciprocating excursion between said salesroom and said stockroom,
    said counter having merchandise shelves arranged on at least two sides thereof;
    said counter having an upper station in said salesroom for selection by customers from the merchandise displayed on said shelves,
    said shelves being readily accessible to said customers,
    said upper floor having an opening therethrough below said shelves of said counter in said upper station;
    and reciprocating actuator means operatively connected between said building and said counter for vertically shuttling said counter through said opening at choice between said upper station and a lower station therefor in said stockroom therebelow,
    said counter, when in said lower station, being accessible to employes in said stockroom for placement thereon of new merchandise to replace merchandise selected therefrom by customers,
    said counter constituting a self-contained vehicle for transferring merchandise from the stockroom to the salesroom,
    whereby said counter is reciprocated directly between said upper salesroom and said lower stockroom for replenishment of displayed merchandise.

2. A facility as in claim 1,
    said facility having a plurality of said counters,
    said counters being arranged in a plurality of rows of upper stations in said salesroom with aisles interspersed between said rows for use by customers,
    said stockroom having merchandise transit accessways passing below the normal locations of said rows of counters in their upper stations;
    and a reserve stock of merchandise arranged in rows below said aisles and adjacent said lower stations.

3. A facility as in claim 2,
    having also guidance means in said stockroom for directing placement of merchandise into appropriate stock rows and positions in said stock rows adjacent said respective lower stations,
    from which stock rows the said merchandise may later be loaded directly onto the respective counters.

4. A facility as in claim 2,
    having also a passageway for accommodating and enabling movement and progressive unloading of a large vehicle into and via successive accessways,
    said accessways leading from said passageway to adjacent rows of reserve stock.

5. A facility as in claim 4,
    said facility having also means for powering the movement of said vehicle along said passageway.

6. A facility as in claim 4,
    said passageway being generally external to the principal part of said stockroom.

7. A facility as in claim 1, wherein, for each of a plurality of counters,
    one of said counters and said actuator means includes a bearing having a vertical axis,
    whereby said counters may be rotated.

8. A facility as in claim 1,
    said counters being circular in plan.

9. A facility as in claim 1,
    said counters being quadrangular in plan.

10. A facility for retail selling of various kinds of packaged merchandise, said facility comprising:
a building having wall means enclosing a stockroom on a lower floor and a salesroom on an upper floor;
at least one reciprocably mounted, two-station, self-service, merchandise-display counter,
said counter having a normal range of reciprocating excursion between said salesroom and said stockroom,
said counter having a plurality of merchandise shelves therealong,
said counter having an upper station in said salesroom for selection by customers from the merchandise displayed on said shelves,
said upper floor having an opening therethrough below said shelves of said counter in said upper station;
reciprocating actuator means operatively connected between said building and said counter for vertically shuttling said counter through said opening at choice between said upper station and a lower station therefor in said stockroom therebelow,
said counter, when in said lower station, being accessible to employes in said stockroom for placement thereon of new merchandise to replace merchandise selected therefrom by customers,
said counter constituting a self-contained vehicle for transferring merchandise from the stockroom to the salesroom;
at least one aisle for use by customers in said salesroom alongside said counter;
a transit accessway for horizontal movement of merchandise through said lower station in said stockroom when said counter is in its upper station,
said accessway being below said counter;
and a reserve stock of merchandise in a row below said aisle and adjacent said accessway.

11. A facility as in claim 10,
said facility having merchandise arranged along said shelves in planned progression as to kind thereof,
said merchandise in said adjacent row in said stockroom being arranged in a generally related progression as to kind thereof.

12. A facility as in claim 10,
wherein said actuator means includes provision for adjustment of the height of said counter when in the lower station.

13. A facility as in claim 10,
said counter being supported on a plurality of piers located within said row of reserve stock.

14. A facility as in claim 10,
said counter being supported upon lateral beam structure of said building.

15. A facility as in claim 10,
having shield means aligned to register with and close said opening against access thereto by customers when said respective counters are moved to their lower stations.

16. A facility for retail selling of various kinds of packaged merchandise, said facility comprising:
a building having wall means enclosing a stockroom on a lower floor and a salesroom on an upper floor;
at least one structural support means within said building having a capacity for holding a complement of such merchandise;
a unitary, self-service counter for transporting and supplying said complement to customers in an upper sales station in said salesroom,
said unitary counter including a shelving array adequate for accommodating and displaying the said merchandise complement of said support means thereon,
said upper floor having an opening therethrough below said array,
said counter having a normal range of reciprocating excursion from said station to a loading station therebelow in said stockroom;
a reciprocating actuater operatively connected to said counter for positioning said counter and complement in a chosen one of said stations and for shuttling said counter and complement at choice between said stations,
said actuator in turn being carried on and reacted by said support means;
and a closure for said opening,
said closure being responsive to the downward reciprocation of said counter into said stockroom and effected thereby,
said closure being disabled when said counter returns to said sales station.

References Cited
UNITED STATES PATENTS 1,819,491  8/1931  White _____ 186—1

RICHARD E. AEGERTER, *Primary Examiner.*

EVON C. BLUNK, *Examiner.*

H. C. HORNSBY, *Assistant Examiner.*